Patented Mar. 2, 1926.

1,574,796

UNITED STATES PATENT OFFICE.

AUGUSTIN AMÉDÉE LOUIS JOSEPH DAMIENS, OF ARCUEIL-CACHAN, MARIE CHARLES JOSEPH ELISÉE DE LOISY, OF PARIS, FRANCE, AND OLIVIER JOSEPH GISLAIN PIETTE, OF BRUSSELS, BELGIUM.

PROCESS FOR THE RAPID FIXING OF ETHYLENE BY MEANS OF SULPHURIC ACID FOR THE PURPOSE OF OBTAINING ETHYL SULPHURIC ESTERS.

No Drawing.   Application filed April 13, 1922.   Serial No. 552,306.

*To all whom it may concern:*

Be it known that we, AUGUSTIN AMÉDÉE LOUIS JOSEPH DAMIENS, of Arcueil-Cachan, Seine, France, MARIE CHARLES JOSEPH ELISÉE DE LOISY, of Paris, France, and OLIVIER JOSEPH GISLAIN PIETTE, of Brussels, Belgium, have invented a process for the rapid fixing of ethylene by means of sulphuric acid for the purpose of obtaining ethyl sulphuric esters, of which the following is a clear and exact description.

It is well known that ethylene is absorbed by sulphuric acid and that according to the conditions under which the operation is carried out, either ethyl sulphuric acid $C_2H_5.HSO_4$, or neutral ethyl sulphate $(C_2H_5)_2SO_4$ is obtained. But the slowness with which this reaction takes place has so far prevented its use on a commercial scale.

In order to accelerate the reaction various means have already been proposed:

1. *Heat.*—By raising the temperature of the acid the rate of the reaction is notably increased, but serious inconveniences then occur: formation of sulphurous gas, carbonaceous matters, to the detriment of ethyl sulphuric acid, formation, besides the latter, of its isomer: isethionic acid, the proportion of which increases as the temperature becomes higher and higher and which has up to now no industrial application.

2. *Pressure.*—By increasing the pressure of the ethylene gas, the rate of its fixing on sulphuric acid is proportionally increased, but considerable pressures must be reached for obtaining a sufficient rate of reaction; moreover this process, applicable to pure ethylene or to gases rich in ethylene, is not industrially applicable when ethylene is to be trapped from complex gases containing only a small proportion of the same.

3. *Catalyzers.*—It has also been proposed to use certain bodies, such as vanadic anhydride, uranyl sulphate, tungstic and molybdic acids, acting as catalyzers, that is to say accelerating by their presence the rate of fixing of ethylene by sulphuric acid, but the researches made by the applicants have shown that with the above mentioned catalyzers only infinitely small quantities of ethyl sulphuric esters are formed and that the main products of the reaction are entirely different bodies.

These various processes allow therefore to obtain only a very small proportion of ethyl sulphuric acid and for this reason it has not been possible to use them industrially.

The present invention has for its object a process permitting the rapid fixing of ethylene by sulphuric acid and practically allowing to obtain only sulphuric esters $C_2H_5SO_4$ (ethyl sulphuric acid) and $(C_2H_5)_2SO_4$ (neutral ethyl sulphate), without formation of isomers or foreign bodies.

This process is essentially characterized by the use of a catalyzer composed of iron, copper, or equivalent common metal; containing the metal under its smallest valency, for instance a ferrous compound $FeSO_4$ (and not a ferric compound such as $Fe_2(SO_4)_3$), a cuprous compound (and not a cupric compound), such as sub-chloride of copper $Cu_2Cl_2$, sub-oxide of copper $Cu_2O$, sub-sulphate of copper $Cu_2SO_4$, etc., or any compounds capable of giving them birth, for instance, copper sulphate $CuSO_4$ and a reducing body which will transform it into cuprous sulphate $Cu_2SO_4$.

During the reaction of sulphuric acid on ethylene in presence of the above mentioned catalyzer the temperature must be maintained between 0 and 50° C., and the preferred temperature range is between 15 and 50° C.

At the end of the operation, ethyl sulphuric acid and neutral ethyl sulphate (both soluble in concentrated sulphuric acid) are obtained. The neutral ethyl sulphate separates by coming to the surface of the liquid when the acid is diluted, any rise of temperature being avoided.

The relative proportions of ethyl sulphuric acid and neutral ethyl sulphate obtained by this process vary according to the conditions under which the operation is carried out, and according to the degree of concentration of the sulphuric acid used and to the temperature at which the reaction is effected, it will be possible to obtain at will one or the other of these ethyl sulphuric esters.

In case it is desired to obtain principally ethyl sulphuric acid $C_2H_5HSO_4$, ordinary sulphuric acid of 66° Baumé is used, that is to say containing 92 to 95% of acid $H_2SO_4$ and the temperature most favorable for the reaction is from 35° to 40° C.

This process presents the main following advantages:

1. The absorption of ethylene is effected with great rapidity and owing to the low temperature at which the process is carried out, the sulphuric acid does not substantially exert any detrimental action on the products formed.

2. The catalyzing body used is a common and cheap product.

3. This catalyzing body is insoluble in sulphuric acid, which differentiates it from the catalyzers used up to this day which were soluble. The considerable advantages connected with this property are, on the one hand, that the greater division of the acid is promoted by the presence in its mass of a precipitate in suspension and, on the other hand, that the catalyzer can easily be collected at the end of the operation, by decantation, filtration or centrifuging, and be used over again for subsequent reactions.

For carrying out the present process in the case of its application to the trapping of ethylene contained in industrial gases; natural gas, gas from the distillation of fuels (coke oven gas, illuminating gas, cracking gas, schist gas, synthetic ethylene, etc.), it is desirable first to free these gases from benzol and ammonia, to dehydrate them and, generally speaking, to free them from products which might be objectionable on account of their action either on the acid or on the catalyzing body (hydrocarbons of the acetylene and ethylene series, homologues of ethylene, sulphurated compounds, etc.).

The reagent fixing the ethylene (sulphuric acid to which is added the catalyzing body) is, after absorption, subjected to decantation, filtration or centrifuging, so that the catalyzing body can be collected and can be returned to the circulation after or without purification.

The production of alcohol or ether by means of ethyl sulphuric acid obtained by the present process is carried out by the ordinary methods: dilution of this acid in a greater or less proportion of water, according as it is desired to produce alcohol or ether, and distillation.

By means of the present process the fixing of ethylene by sulphuric acid is rapidly effected at ordinary temperature and the neutral ethyl sulphate begins to form when the acid reaches a concentration in acid sulphate or ethyl sulphuric acid which is only of 25.6% instead of 75% in the old process. The final output is therefore very considerably increased. While the appended claims refer specifically to compounds of copper, it will be understood that iron and other equivalents may be substituted for copper, and we desire the claims to be interpreted as covering such equivalents.

Claims—

1. A process for the rapid fixing of ethylene by sulphuric acid for the purpose of the industrial production of sulphuric esters $C_2H_5SO_4$ (ethyl sulphuric acid) and $(C_2H_5)_2SO_4$ (neutral ethyl sulphate), which consists: in adding to sulphuric acid of about 66° Baumé, as catalyzer, a cuprous compound containing copper in the monovalent state, in causing a gaseous current containing ethylene to pass through this acid, maintaining during the reaction a temperature of from 0° to 50° C.—separating the catalyzer from the acid, diluting the latter, and collecting, on the one hand the neutral ethyl sulphate which floats to the surface of the sulphuric acid and, on the other hand, the ethyl sulphuric acid which remains in solution in this acid.

2. A process for the rapid fixing of ethylene by sulphuric acid for the purpose of the industrial production of sulphuric esters $C_2H_5SO_4$ (ethyl sulphuric acid) and $(C_2H_5)_2SO_4$ (neutral ethyl sulphate), which consists: in adding to sulphuric acid of about 66° Baumé, as catalyzer, sub-oxide of copper $Cu_2O$, in causing a gaseous current containing ethylene to pass through this acid, maintaining during the reaction a temperature of from 0° to 50° C., separating the catalyzer from the acid, diluting the latter, and collecting on the one hand the neutral ethyl sulphate which floats to the surface of the sulphuric acid and, on the other hand, the ethyl sulphuric acid which remains in solution in this acid.

3. A process for the rapid fixing of ethylene by sulphuric acid for the purpose of obtaining principally ethyl sulphuric acid, which consists: in adding, as catalyzer, to ordinary concentrated sulphuric acid of about 66° Baumé, a cuprous compound containing copper in the monovalent state,— in causing a gaseous current containing ethylene to pass through this acid, maintaining during the reaction the temperature between 15° and 50° C.,—and in collecting the sulphuric solution which contains ethyl sulphuric acid with traces only of neutral ethyl sulphate.

4. A process for the rapid fixing of ethylene by sulphuric acid for the purpose of obtaining principally ethyl sulphuric acid, which consists: in adding, as catalyzer, to ordinary concentrated sulphuric acid of about 66° Baumé, sub-oxide of copper $Cu_2O$,—in causing a gaseous current containing ethylene to pass through this acid, maintaining during the reaction the temperature between 15° and 50° C.—and in collecting the sulphuric solution which contains ethyl sulphuric acid with traces only of neutral ethyl sulphate.

The foregoing specification of our process for the rapid fixing of ethylene by means of sulphuric acid for the purpose of obtaining ethyl sulphuric ethers, signed by us this 22d day of March, 1922.

AUGUSTIN AMÉDÉE LOUIS JOSEPH DAMIENS.
MARIE CHARLES JOSEPH ELISÉE de LOISY.
OLIVIER JOSEPH GISLAIN PIETTE.